United States Patent [19]

Suzuki

[11] Patent Number: 4,809,061
[45] Date of Patent: Feb. 28, 1989

[54] IMAGE READOUT METHOD AND APPARATUS

[75] Inventor: Kenji Suzuki, Kanagawa, Japan

[73] Assignee: Fuji Photo Film Co., Ltd., Kanagawa, Japan

[21] Appl. No.: 158,137

[22] Filed: Feb. 17, 1988

Related U.S. Application Data

[63] Continuation of Ser. No. 835,309, Feb. 21, 1986.

[30] Foreign Application Priority Data

Feb. 21, 1985 [JP] Japan .................................. 60-31597
Feb. 21, 1985 [JP] Japan .................................. 60-31598
Feb. 21, 1985 [JP] Japan .................................. 60-31599

[51] Int. Cl.$^4$ ............................................. H04N 1/46
[52] U.S. Cl. ........................................ 358/75; 358/29; 358/50
[58] Field of Search ................... 358/75, 29, 50, 41, 358/43, 44, 29 C

[56] References Cited

U.S. PATENT DOCUMENTS

| | | | |
|---|---|---|---|
| 4,016,598 | 4/1977 | Yamanaka | 358/41 |
| 4,106,056 | 8/1978 | Nagumo et al. | 358/50 |
| 4,244,003 | 1/1981 | Poetsch et al. | 358/50 |
| 4,249,203 | 2/1981 | Yamanaka | 358/50 |
| 4,464,677 | 8/1984 | Kuhn et al. | 358/75 |
| 4,506,294 | 3/1985 | Nagumo | 358/50 |
| 4,558,357 | 12/1985 | Nakagawa et al. | 358/75 |
| 4,610,537 | 9/1986 | Matsumoto | 355/68 |
| 4,641,183 | 2/1987 | Kinoshita | 358/41 X |
| 4,667,226 | 5/1987 | Glenn | 358/41 |
| 4,688,099 | 8/1987 | Funston | 358/54 X |
| 4,692,794 | 9/1987 | Suzuki | 358/44 |
| 4,731,661 | 3/1988 | Nagano | 358/75 |

FOREIGN PATENT DOCUMENTS 56-058370 5/1981 Japan .................................. 358/75

Primary Examiner—James J. Groody
Assistant Examiner—E. Anne Faris
Attorney, Agent, or Firm—Young & Thompson

[57] ABSTRACT

The image readout apparatus has a plurality of independently driven image sensors. The charge storage time for each image sensor is determined based on light incident thereto, and the signal pickup is started in the storage completion order of the image sensor. The time sequential signal readout of each image sensor is sent to a single signal processor and thereafter it is stored in a memory. In the case of concurrent storage start of the image sensors, if the charge storage of an image sensor is terminated while the signal pickup of another image sensor is performed, the signal pickup of the former image sensor is temporarily delayed. To shorten the wait time for the signal pickup, the storage start time for each image sensor is shifted so as to realize a continuous signal pickup among the image sensors.

13 Claims, 8 Drawing Sheets

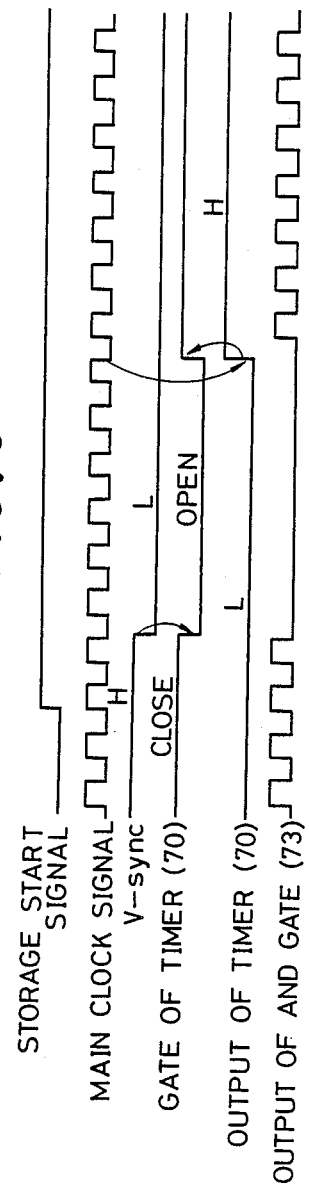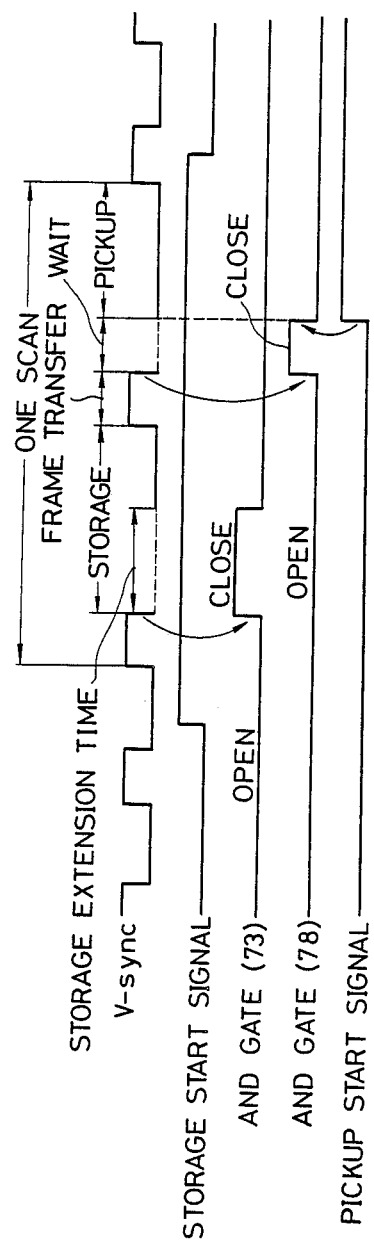

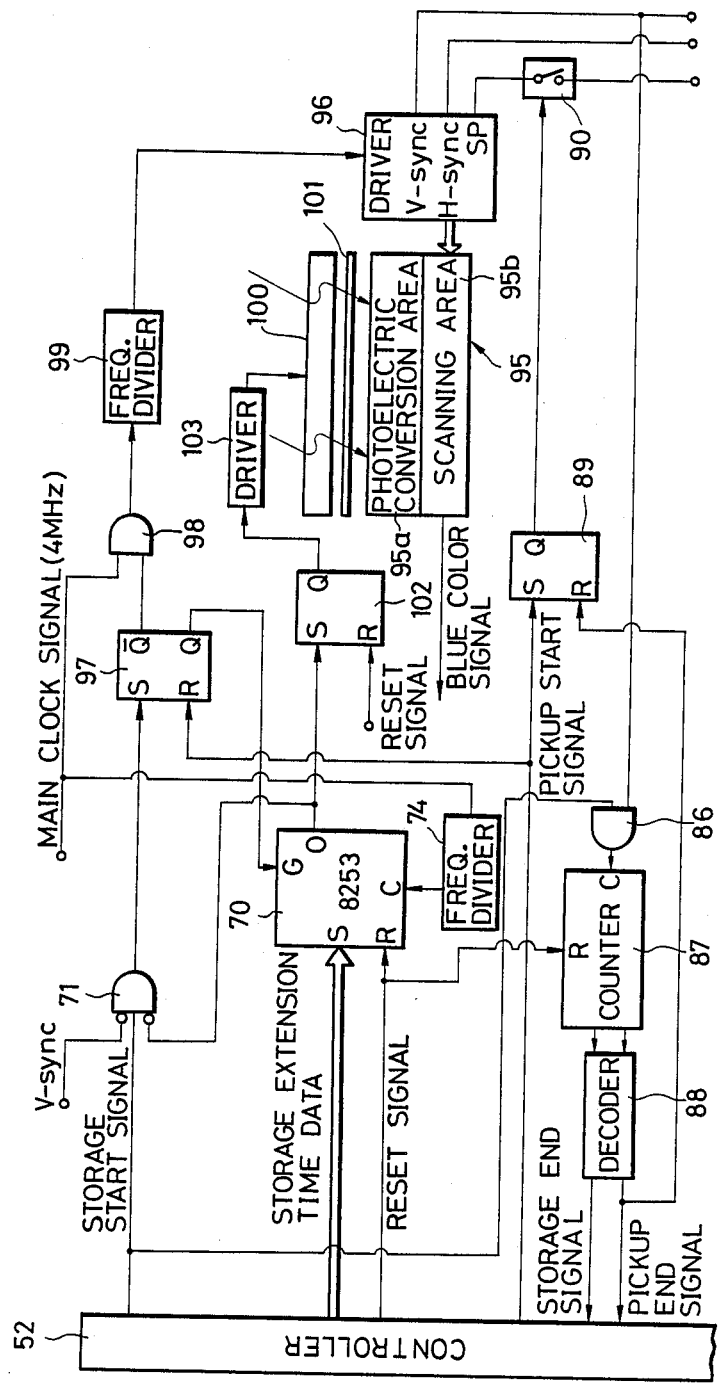

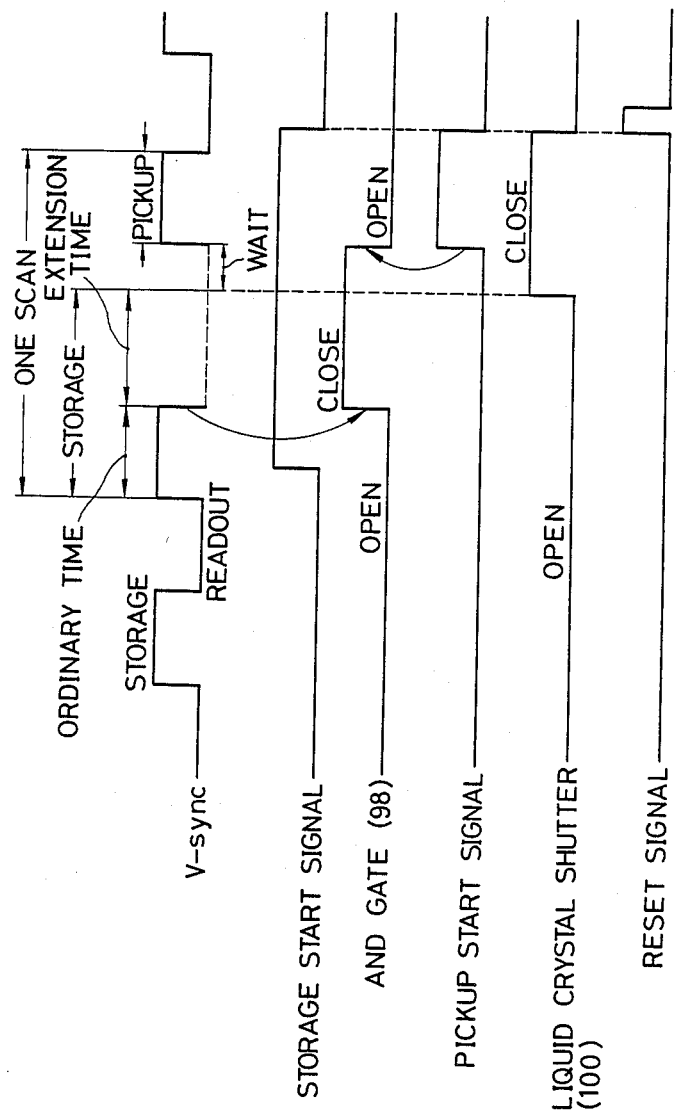

IMAGE READOUT METHOD AND APPARATUS

This application is a continuation of application Ser. No. 835,309, filed 2/21/86.

BACKGROUND OF THE INVENTION

The present invention relates to an image read-out method and apparatus for reading a half-tone image with a storage-type image sensor (hereinafter referred to simply as an image sensor), and more particularly to a method and apparatus suitable for reading a color image.

In general, an image readout apparatus is used as an input unit for an image reproducing apparatus or an image recording apparatus. An image readout apparatus is also used for sampling the characteristics of an image. For example, prior to color printing with a color printer, three-color (blue, green, red) densities of a plurality of points defined on a color original (color negative film, color positive film or the like) are measured. Color originals are scene-classified based on the three-color density of each point. Each classified scene is then subjected to color correction to reproduce a fine, color-balanced print.

Conventionally, a known image readout apparatus is constructed of: three image sensors, each photoelectrically converting a corresponding one of three colors of light into an electric signal and storing it; three signal processors for processing time-sequential signals outputted from the respective image sensors; and a storage unit for storing the outputs of the signal processors. The signal processor of the image readout apparatus of this type is provided independently for each color and is expensive due to its high speed operation for picking up the respective time sequential signals in parallel. Therefore, there is a problem that the apparatus is complicated and expensive.

OBJECTS OF THE INVENTION

It is an object of the present invention to provide an image readout method and apparatus capable of processing signals with a single signal processor, by sequentially picking up signals from a plurality of image sensors.

It is another object of the present invention to provide an image readout method and apparatus capable of broadening the dynamic range of the image sensor and obtaining signals with less noise, by independently setting a charge storage time of each image sensor based on light incident thereon.

It is a further object of the present invention to provide an image readout method capable of reading an image at high speed, by driving respective image sensors in parallel.

It is a still further object of the present invention to provide an image readout method capable of obtaining signals with less noise, by picking up each signal in such a way that the wait time for picking up each signal of the image sensor becomes shorter.

SUMMARY OF THE INVENTION

To achieve the above and other objects of the present invention, the charge storage time and the signal pickup start time of the image sensor are independently controlled. Image sensors store charges in parallel, and the signal pickup is performed in the charge storage completion order of the image sensor, i.e., in the order starting from the image sensor that has first completed its charge storage, and proceeding to the second and so forth.

The charge storage time of each image sensor is independently controlled based on its incident light. There are two drive methods for the image sensors: according to the first method, the storage start time of each image sensor is varied, and the charge storage is carried out in parallel. Thereafter, in the charge storage completion order of the image sensor, the signals are picked up seriatim. According to the second method, the charge storage of each image sensor is started at the same time and stopped after the lapse of each particular charge storage time. Thereafter, the signals are sequentially picked up, in the charge storage completion order of the image sensor.

As the image sensor mentioned above, there are known a CCD type image sensor, an MOS type image sensor, a CPD type image sensor, and the like, to all of which the present invention is applicable. In the case of a CCD type image sensor, the charge storage is terminated completely when a charge signal is transferred to the transfer area from the sensing area, and the charge storage period is the period from the start of charge storage to the time of charge transfer. The signal pickup is achieved by transferring a charge signal to the output area from the transfer area having a capability of storing charge. Transfer of the charge signal from the sensing area to the transfer area may be performed either by an interline system or by a frame transfer system. In the case of an MOS type image sensor, the signal pickup is achieved by MOS transistors arranged in a matrix configuration, so that the times when the charge storage is terminated and the signal is picked up, become equal. Therefore, it is necessary for the MOS type image sensor to be shielded from incident light at the end of charge storage if the succeeding signal pickup is temporarily delayed, although this is not necessary if the signal pickup is carried out immediately after the end of charge storage. Shielding from incident light may be achieved either by inserting a color filter complementary to its color of light, or by closing a shutter disposed in front of any image sensor which has completed its charge storage.

In the case of reading a color image, three types of image sensors are used: it.e., a blue color image sensor for photoelectrically converting the blue color of incident light; a green color image sensor for photoelectrically converting the green color of incident light; and a red color image sensor for photoelectrically converting the red color of incident light. Alternatively, in the case of an apparatus which discriminates between a front-lighted image and a rear-lighted image by measuring a (white or gray) density of each area of a plurality of areas, e.g., a middle area and a peripheral area, obtained by partitioning a color original, two image sensors each being partially shielded from light for measurement of a particular area are used.

According to the present invention, the charge storage times and the pickup start times, of a plurality of image sensors, are independently controlled. Each image sensor is driven in parallel during the charge storage, and the signal is picked up sequentially in the charge storage completion order of the image sensor. Therefore, only one signal processor is needed, and this greatly reduces the cost of the apparatus.

Furthermore, the charge storage time is changed based on the incident light, so that the dynamic range is broadened and a highly precise readout with less noise is possible. Still further, since the signal pickup time is relatively shorter than the charge storage time, a relatively high speed readout is possibly by carrying out the charge storage in parallel. In addition, the storage start time is shifted for each image sensor in order to make the wait time for a signal pickup shorter. Therefore, it is advantageous in that a dark current, which might be generated during the wait time for the signal pickup, is not generated.

BRIEF DESCRIPTION OF THE DRAWINGS

FIG. 5 is a timing chart showing the operation of the timer of FIG. 4;

FIG. 6 is a timing chart showing the operation of one scan;

FIG. 7 is a circuit diagram showing one example of the blue color controller used in an MOS-type image sensor;

FIG. 8 is a timing circuit showing the operation of one scan as in the circuit of FIG. 7;

DETAILED DESCRIPTION OF THE PREFERRED EMBODIMENTS

Figure 11:
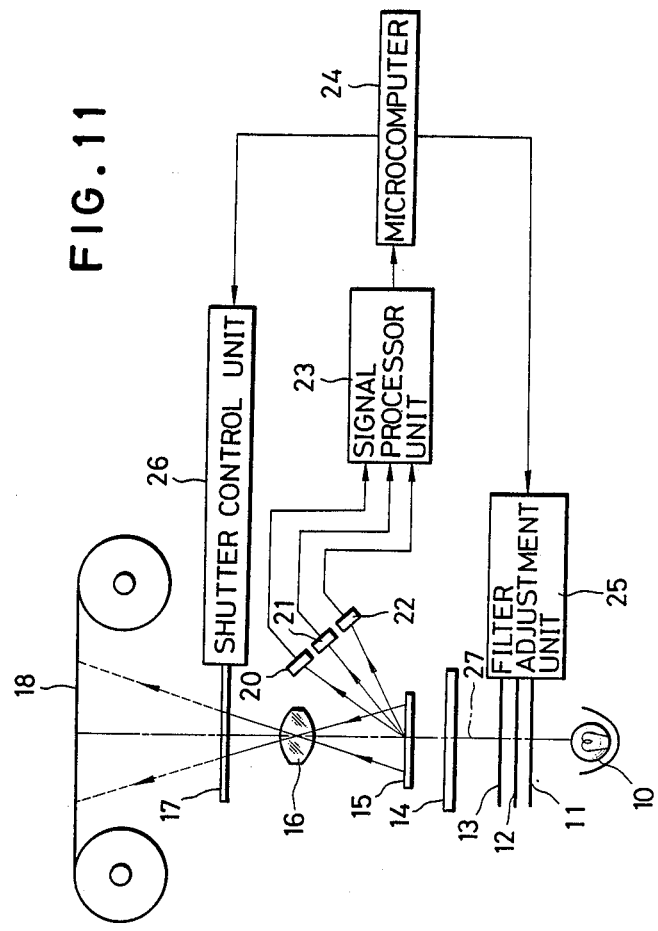
FIG. 11 schematically shows a color printer using the image readout apparatus of the present invention.

FIG. 11 shows a color printer having a built-in image readout apparatus of the present invention. White light radiated from a light source 10 reaches a diffusing plate 14 via a yellow filter 11, a magenta filter 12 and a cyan filter 13 in this order. Light diffused by the diffusing plate 14 is applied to a color original 15. Light passing through the color original then passes via a lens 16 and an open shutter 17 to a color paper 18. The lens 16 is moved in accordance with the magnification ratio and focusses the color image recorded on the color original 15 onto the color paper 18.

Outside the optical path of the lens 16, there are mounted a blue color measuring unit 20 for measuring a blue color component of each pixel of the color original 15, a green color measuring unit 21 for measuring a green color component, and a red color measuring unit 22 for measuring a red color component. The color measuring units 20 to 22 are driven in parallel for respective, predetermined charge storage times to photoelectrically convert their incident colors of light. Thereafter, signals are read in the charge storage (hereinafter referred to as merely as storage) completion order of the image sensors, and sent to a signal processor unit 23. A microcomputer 24 reads the three-color densities of each pixel that has been stored in the signal processor unit 23 and accumulates the densities to calculate a large area transmitting density (LATD) for each color. Based on the large area transmitting density and the hue (a balance of blue, green and red densities) of each pixel, the scenes of the color originals are divided into standard scenes, color-failure scenes and density-failure scenes. Based on the division result and in the case of the color-failure scenes, a filter adjustment unit 25 is controlled in accordance with the color failure of the scenes to adjust the amount of insertion into the optical path 27 of the yellow filter 11, the magenta filter 12 and the cyan filter 13, respectively. In the case of the density-failure scenes, a shutter control unit 26 is controlled to adjust the open time of the shutter 17. In the case of the standard scenes, a known control is effected by means of an LATD method.

Figure 1:
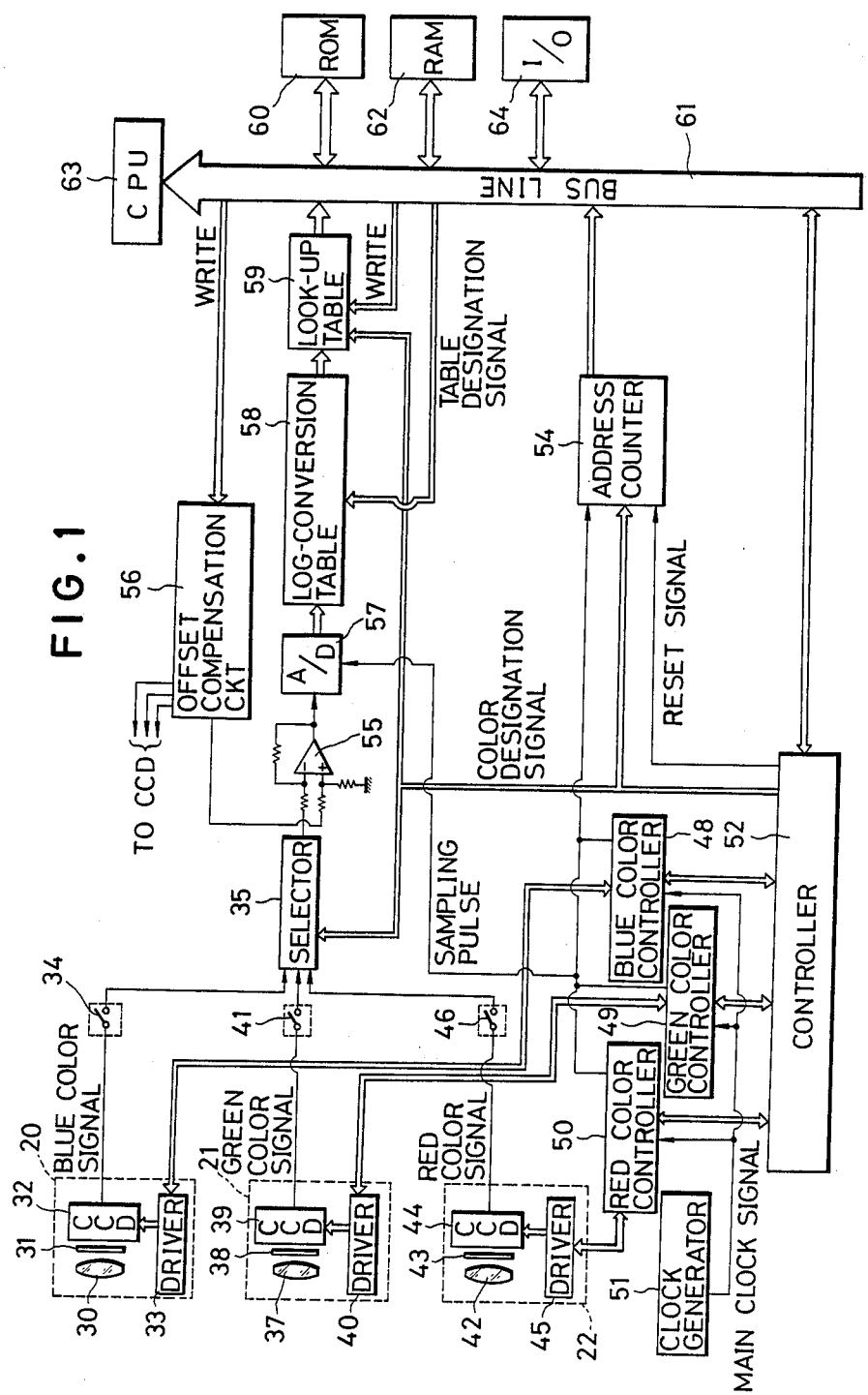
FIG. 1 is a block diagram showing an embodiment of the image readout apparatus according to the present invention.

FIG. 1 shows the construction of the image readout apparatus of the present invention. The blue color measuring unit 20 is comprised by a lens 30, blue filter 31, image sensor 32 and driver 33 for driving the image sensor 32. After passing through the blue filter 31, light is applied to the image sensor 32 and photoelectrically converted for each pixel. The resultant signals are respectively stored. The blue filter 31 may be formed directly on the image sensor by means of evaporation or the like.

The image sensor 32 is a CCD type image sensor comprised by a plurality of pixels 320 arranged in a matrix configuration. The storage and signal readout are performed at preset times by the driver 33. However, an analog switch 34 is ordinarily in an OFF state so that the read-out blue signal is not sent to a selector 35. However, since the image sensor is periodically driven, an effective storage is performed and the resultant effective time sequential color signal is picked up via the analog switch 34.

In general, in order to measure the density of a photographic image, a dynamic range in the order of 10,000 steps is required. However, since the dynamic range of an image sensor such as a CCD type is narrow, a highly precise measurement is not possible. It is sufficient however for any one color original if only the density level has about 100 steps. Therefore, it is possible to substantially broaden the dynamic range and effect a highly precise measurement by changing the storage time of the image sensor in conformity with the color original.

A pre-scan is conducted prior to a main scan to determine the storage time of the image sensor 32. The storage time during the main scan is determined in accordance with the maximum value of the signal obtained during the pre-scan. Therefore, effective storage and signal pickup are carried out twice. If the signal pickup from the image sensor 32 is performed at low speed, it is possible to use a low-speed inexpensive signal processor, which is advantageous as to cost. Therefore, in this embodiment, the effective signal pickup is performed slower than the signal readout which is carried out periodically.

Similarly, the green color measuring unit 21 is comprised by a lens 37, green filter 38, image sensor 39 and a driver 40. A time sequential signal is picked up via an analog switch 41 during the pre-scan and main scan.

The red color measuring unit 22 is constructed of a lens 42, red filter 43, image sensor 44 and driver 45. The signal is picked up via an analog switch 46.

A blue color controller 48 is provided to conduct the pre-scan and main scan of the image sensor 32. The blue color controller 48 controls the driver 33 to effect the storage for a predetermined time and pick up the signal slowly. Similarly, there are provided a green color controller 49 for controlling the driver 40 and a red color controller 50 for controlling the driver 45. In this embodiment, each controller 48 through 50 inhibits the passage of a main clock signal of 4 MHz outputted from a clock generator 51 and used as a master clock signal for the drivers 33, 40 and 45, and changes the storage time and readout start time independently for each color. Also, each controller 48 through 50 divides the main clock signal as the master clock signal to change the readout speed. In particular, if the drivers 33, 40 and 45 are not supplied with the master clock signal, the photoelectric conversion continues as it is. Therefore, if the main clock signal is interrupted for the time obtained from the time difference (storage extension time) between a desired storage time and the time the drivers 33, 40 and 45 operate without application of the master clock signal, it is possible to set a desired storage time. The signal readout is performed in synchro with the master clock signal so that if a master clock signal of a long period is applied to the drivers 33, 40 and 45, the signal pickup can be carried out slowly.

The controller 52 informs the controllers 48 to 50 of the storage extension time, storage start time and pickup start time for each color. The controller 52 informs an address counter 54 of the type of color signal undergoing pickup, and switches the selector 35 to send the color signal to an amplifier 55. To adjust offsets of the amplifier 55 and image sensors 32, 39 and 44, there is provided an offset compensation circuit 56 which outputs a voltage signal by digitally converting data written by CPU 63.

The time sequential color signal amplified by the amplifier 55 is sent to an A/D converter 57. The A/D converter 57 samples the color signal in response to sampling pulses outputted from the controllers 48 to 50. The sampled color signal is converted into an 8-bit digital signal and sent to a log-conversion table 58. The log-conversion table 58 has 15 tables for example. A density value is obtained by referring to the table selected in accordance with the base density of the color original 15, i.e., the storage time of the image sensor, and by logarithmically converting the digital signal. About 250 density values are written in each table and about 10000 density steps are included as a whole excepting those that overlap.

The density signal outputted from the log-conversion table 58 is sent to a reference table 59 having three tables. By referring to the table corresponding to the color designated by the controller 52, gamma correction and sensitivity correction are effected. The reference table 59 is comprised by RAMs in which data in ROM 60 is previously written. The density data specified by the reference table 59 is sent via a bus line 61 to RAM 62 and written therein at a memory address designated by the address counter 54. The address counter 54 is reset by the controller 52 at the start of each color signal pickup and counts the sampling pulses. The address of RAM 62 is identified by the count and color signal.

CPU 63 controls the whole circuit in accordance with the programs written in ROM 60 and instructs the writing of the necessary data in the associated circuit. In particular, CPU 63 informs the controller 52 of the storage extension time for each color and the storage and signal pickup times. Also, CPU 63 identifies the page of the log-conversion table 58 corresponding to the storage time, and writes data in the reference table 59 and in the offset compensation circuit 56. An I/O port 64 is connected to the filter adjustment unit 25 and shutter control unit 26 shown in FIG. 11.

Figure 2:
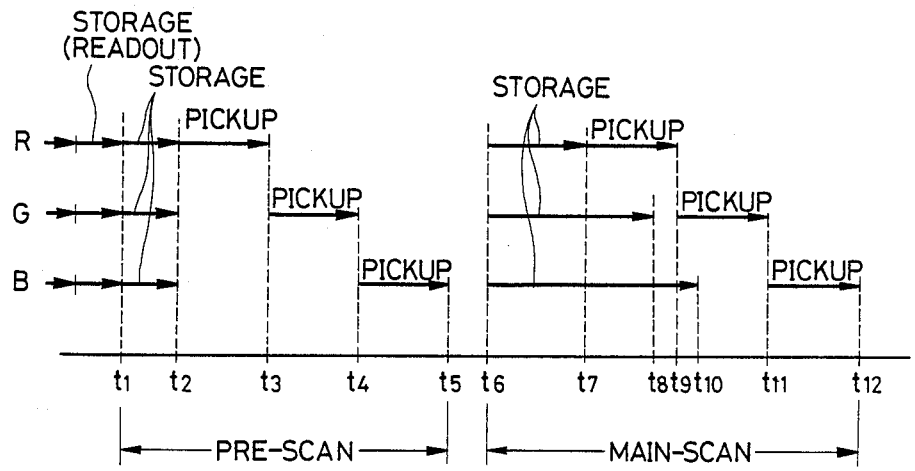
FIG. 2 is a diagram for illustating the pre-scan and main scan of the image readout method according to the present invention, wherein the storage start is simultaneously effected.

FIG. 2 shows the timing during the pre-scan and main scan. When the color original 15 is placed in a measuring position, a detection signal from a sensor (not shown) is sent to CPU 63. Then, the image sensors 32, 39, 44 operating for a predetermined period sequentially start their pre-scan and main scan. In starting the pre-scan, CPU 63 first informs the controller 52 of the storage extension time and operation times. The controller 52 sends storage start signals to the controllers 48 to 50 at time t1 to prevent the master clock signal from being inputted to the drivers 33, 40 and 45. In this case, the drivers 33, 40 and 45 are made inoperative whilst the photoelectric conversion and charge storage continue. After the lapse of a predetermined storage extension time, the master clock signal is released and sent to the drivers 33, 40 and 45. Then the drivers 33, 40 and 45 start a normal operation so that storage continues for a normal storage time. During this storage, reading the charge accumulated during the preceding photoelectric conversion is simultaneously performed. However, the readout signal is not applied to the selector 35 since the analog switches 34, 41 and 46 are in an OFF state.

At time t2, the storage of each image sensor 32, 39 and 44 is terminated. Therefore, the storage time T is (t2−t1), which is the sum of the normal storage time and the storage extension time. After storage, the stored charge signal is transferred to and preserved in the transfer area. In FIG. 2, the transfer time is not shown. After this charge transfer, each color signal is sequentially picked up from the image sensors 32, 39 and 44. In this embodiment, the color signal is picked up in the order of red, green and blue.

Upon reception of a storage end signal from the red color controller 50, the controller 52 sends a pickup start signal for a red color signal to the red color controller 50 to start picking up the red color signal. Simultaneously therewith, the controller 52 sends a color designation signal designating the color signal to be picked up to the selector 35 to thereby connect the image sensor to the amplifier 55. The color designation signal is also sent to the reference table 59 to select the table for the read color signal. Furthermore, the color designation signal is sent to the address counter 54 and used as the first two bits of the address. The controller 52 sends a reset signal to the address counter to reset it.

The red color controller 50 turns ON the analog switch 46 and sends the master clock signal obtained by dividing the main clock signal to the driver 45. The driver is driven by the master clock signal of a long period to send the charge signal stored in the transfer area to the output area and convert it into a voltage signal and hence output it as a red color signal. The time sequential red color signal outputted from the output area is sent via the analog switch 46 to the amplifier 55. The amplified signal is then sent to the A/D converter 57. The A/D converter 57 samples and holds the red color signal in response to the sampling pulses synchronizing with the readout of the red color signal. The sampled and held red color signal is converted into a digital signal. The log-conversion table 58 logarithmically converts, by referring to the page selected in accordance with the storage time, the digital signal into a red color density. The red color density specified by the look-up table 59 is written in RAM 62 at the address identified by the address counter 54.

When the red color signal pickup is completed at time t3, the red color controller 50 sends a pickup end signal to the controller 52. The controller 52 confirms the generation of the storage end signal from the green color controller 49 and thereafter sends a pickup start signal for a green color signal to the green color controller 49, switches the selector 35 and selects the pages of the log-conversion table 58 and reference table 59. Simultaneously therewith, the address counter 54 is set and the analog switch 41 is turned ON. Similarly to the procedure for the pickup of the red color signal as described previously, the charge signal stored in the transfer area is transferred to the output area and converted into a green color signal. Thereafter, the green color signal is picked up as a time sequential green color signal and processed for writing in RAM 62.

At time t4, pickup the blue color signal starts. The picked-up blue color signal is also processed for writing in RAM 62. The pickup of the blue color signal is completed at time t5 and the pre-scan started at time t1 is terminated. Thereafter, the controller 52 outputs reset signals to the associated circuits to reset them.

After completion of the pre-scan, CPU 63 checks the brightest portion (minimum density) of the color original and determines the storage extension time for each color during the main scan in such a way that light from the brightest portion becomes the saturation value of the image sensor. The resultant storage extension time for each color is sent to the controller 52. The page of the log-conversion table 58 is designated by the resultant storage extension time.

After determination of the storage extension time, similarly to the pre-scan, the controllers 48 to 50 are supplied with the storage start signals at time t6 to start the storage. The storage time for the red color is terminated at time t7. Then, after the charge signal is transferred to the transfer area, a time sequential red color signal is picked up and processed for writing in RAM 62. While picking up the red color signal, the storage of the green color is completed at time t8. In this case, the charge signal is transferred to and preserved in the transfer area. At time t9 when the pickup of the red color signal is completed, the delayed pickup of the green color signal starts and the picked-up green color signal is stored in RAM 62. The storage of the blue color is completed at time t10 and the pickup of its charge signal is delayed. The pickup of the blue color signals starts at time t11 when the pickup of the green color signal is completed. At time t12, the pickup of the blue color signal is completed and the main scan started at time t6 is also completed.

After completion of the main scan, the controller 52 resets the associated circuits. Therefore, the main clock signal not subjected to frequency division by the frequency divider 79 is inputted as a master clock signal to the drivers 33, 40 and 45, so that the image sensors 32, 39 and 44 perform the storage and readout for an ordinary period. In this case, however, since the analog switches 34, 41 and 46 are in an OFF state, the readout color signals are not applied to the selector 35.

In the embodiment described above, since a CCD-type image sensor is used and frame transfer is employed, the transfer time between the storage and readout is required as discussed previously. However, in case the CCD-type image sensor employing an interline transfer is used, or the MOS-type image sensor which picks up charges by using MOS transistors, the transfer time is not required and the readout can be started immediately after storage.

If CCD-type image sensors are used, noises caused by dark current are generated at both the sensing area and the transfer area. The noises tend to increase in proportion with the lapse of time. Therefore, in order to reduce the noise, it is desirable that after the charge signal is transferred from the sensing area to the transfer area, the pickup of the color signal be started at once without incorporating a wait time for the pickup.

Figure 3:
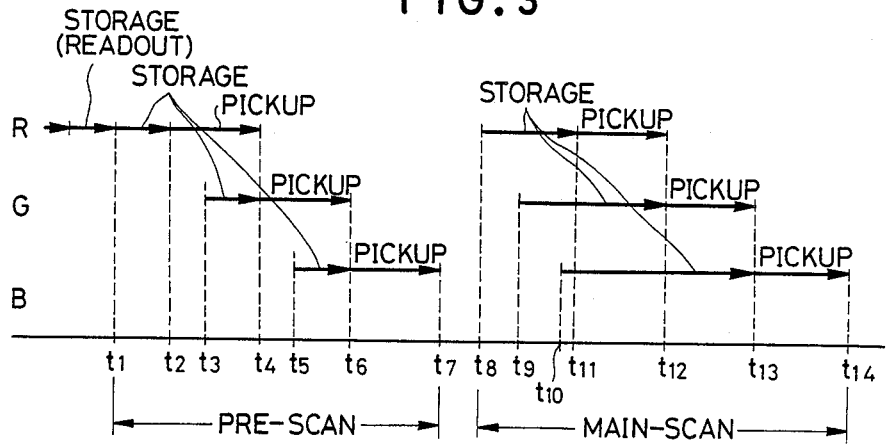
FIG. 3 is a diagram similar to FIG. 2 but wherein the storage start is shifted for each color.

FIG. 3 shows an embodiment wherein the pickup of each color signal can be carried out without incorporating a wait time by shifting the storage start for each color signal. The storage of a red color signal starts at time t1. After the lapse of the predetermined storage time at time t2, the charge signal is transferred to the transfer area to terminate the storage. After the end of the storage, the pickup of the red color signal is carried out from time t2 to time t4. This signal pickup time is determined based on the period of the master clock signal and the number of pixels and is the same for each image sensor 32, 39 and 44.

During the pickup of the red color signal at time t3, the storage of a green color signal starts. This storage start time is the time delayed from the red color storage start time t1 by the subtraction of time (t4−t1) necessary for the red color storage and signal pickup by time (t4−t3) necessary for the green color storage. The green color signal after the storage is subjected to signal pickup until time t6. During the green color signal pickup at time t5, the storage of a blue color signal starts. At time t6 when the green color signal pickup is completed, the storage of a blue color signal is completed. The blue color signal pickup continues from time t6 to time t7.

The pre-scan continues from time t1 to time t7 and thereafter the associated circuits are reset to determine the storage extension time for each color during the main scan. The main scan starts at time t8. First, the storage of a red color signal starts which is the shortest storage time. The storage of a red color signal continues until time t11 and the pickup of the red color signal is carried out from time t11 to t12.

The storage of a green color signal having the second shortest storage time starts at time t9, whereas the storage of a blue color signal having the longest storage time starts at time t10. At time t12 when the red color signal pickup is completed, the pickup of the green color signal starts. At time t3 when the green color signal pick-up is completed, the pickup of the blue color signal starts and terminates at time t14. After completion of the main scan, the controller 52 resets the associated circuits to operate the image sensors for an ordinary period.

In the above embodiment, the storage is started from the color having the shortest storage time. However, in case for example the storage time for a green color signal is longer than the sum of the red color signal storage time and its signal pickup time, the storage of the green color signal is first started and thereafter the storage of the red color signal having the shortest storage time is started. If the storage is started in the order starting from the longest storage time, then the change in order as above noted does not occur. In this case the process time of the overall system becomes somewhat long. Furthermore, in the above embodiment, after completion of the signal pick-up of the red color signal for example, the green color signal pickup is immediately started. However, there may be some time lag between both color signal pickups.

If the storage time during the pre-scan is made equal to the storage time while the drivers are in a normal operation, then it is possible to omit the storage of the pre-scan. In this case, the color signal pickup can be started immediately after the pre-scan is started. Also, in this pre-scan, the digital color signal may directly be stored in RAM 62 without subjecting it to the log-conversion and referencing. In this case, the storage time during the main scan is determined in such a way that the maximum value of the signal becomes approximately the saturation value of the image sensor.

Figure 4:
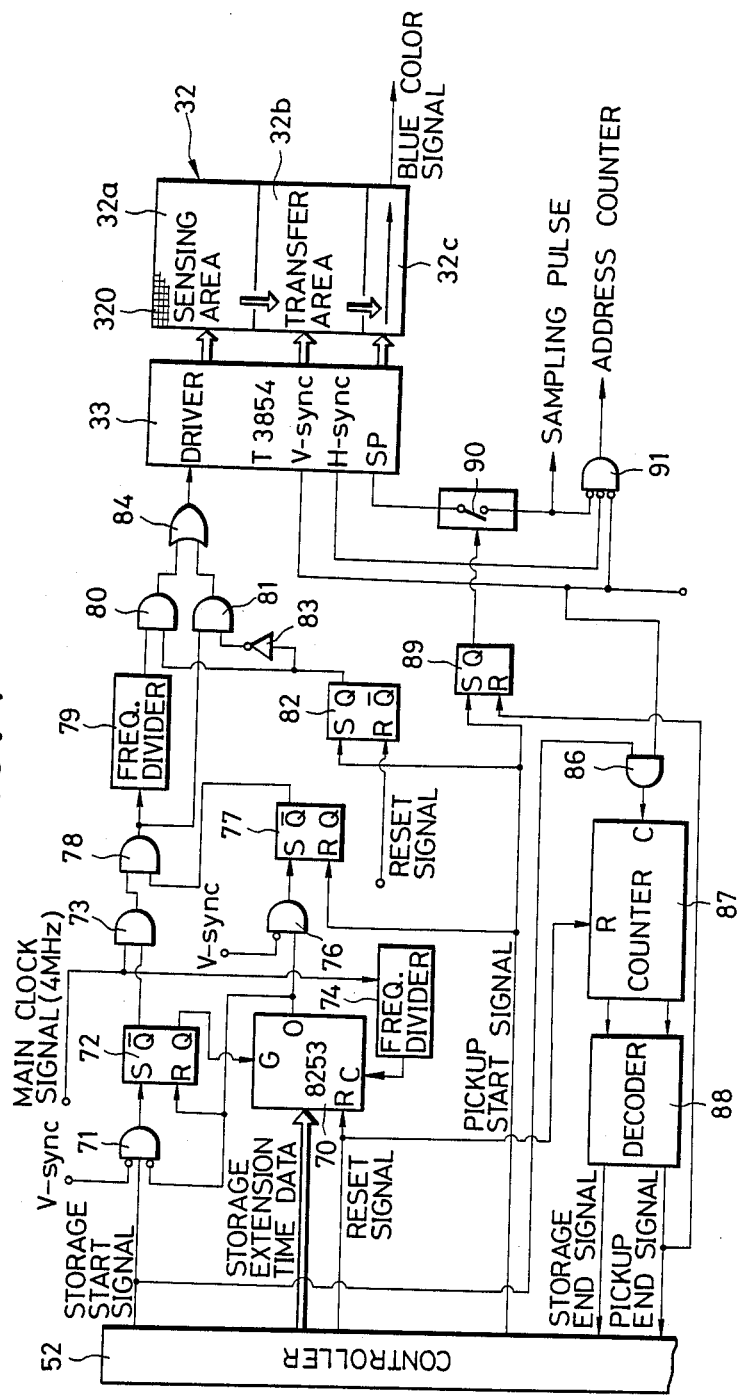
FIG. 4 is a circuit diagram showing an embodiment of the blue color controller.

FIG. 4 shows an example of the blue color controller for effecting a frame transfer. The controller 52 sets in a timer 70 the storage extension time data obtained during the pre-scan, and thereafter the storage start signal is sent to an AND gate 71. The AND gate 71 is inputted with a vertical sync signal (V-sync) so that when the vertical sync signal changes to a low level (hereinafter "L"), the output of the AND gate 71 changes to a high level (hereinafter "H"). A flip-flop 72 is set at the time of the transition from "L" to "H". When the flip-flop 72 is set, the output at the terminal $\overline{Q}$ changes from "H" to "L" so that an AND gate 73 is closed. When the AND gate 73 is closed, transmission of the main clock signal is stopped as shown in FIG. 5. Thus, as described previously, the driver 33 temporarily becomes inoperative. However, although the master clock signal is not applied to the driver, the image sensor 32 still continues its storage as it is.

When the flip-flop 72 is set, the output at the terminal Q becomes "H" so that the gate of the timer 70 is opened as shown in FIG. 5. Thus, a clock signal obtained by dividing the main clock signal by the frequency divider 74 is inputted to the timer 70. The timer 70 counts the inputted master clock signal. When the content of the timer 70 becomes equal to the storage extension time, the output at the terminal O becomes "H" and the gate is closed to stop counting the master clock signal. When the output at the output terminal O becomes "H", the flip-flop 72 is reset so that the AND gate 73 is opened to permit the main clock signal to pass and place the driver 33 in an ordinary operation condition. Furthermore, since the output of the timer 70 is inputted to the AND gate 71, the flip-flop 72 is not set even if the vertical sync signal again changes to "L" during one scan.

When the AND gate 73 opens after the storage extension time and the main clock signal is permitted to pass, then the operation of the driver 33 is initiated to further continue the storage for a normal storage time. When the vertical sync signal changes to "H", the frame transfer starts and the storage is completed. Thereafter when the vertical sync signal changes to "L", an AND gate 76 which gives a logical product of the output signal of the timer 70 and the vertical sync signal, changes to "H" to accordingly set a flip-flop 77. When the flip-flop 77 is set, an AND gate 78 is closed so that transmission of the main clock signal is stopped and the operation of the driver is stopped. Upon stoppage of the operation of the driver 33, the start of picking up changes transferred to the transfer area is delayed.

When the controller 52 outputs the pickup start signal, the flip-flop 77 is reset so that the AND gate 78 is again opened to send the main clock signal and hence the master clock signal to the driver 33. When the master clock signal is inputted to the driver 33, the delayed pickup of the blue color signal starts. Therefore, there is no wait time for the pickup if the pickup start signal is generated immediately after completion of the storage. In addition, a wait state for the pickup can be obtained by delaying the generation of the pickup start signal by a desired time.

In order to perform the blue color signal pickup slowly, a frequency divider 79 and an AND gate 80 are provided. The AND gate 80 is coupled across the serial circuit constructed of the frequency divider 79 and the AND gate 80. The AND gates 80 and 81 are selectively opened by the flip-flop 82 which is set by the pickup start signal. In particular, during storage or transfer, the flip-flop 82 is reset to "L" at its terminal so that the AND gate 80 is closed. On the other hand, since a signal inverted by an inverter 83 is inputted to the AND gate 81, the AND gate 81 is opened to send the main clock signal to an OR gate 84. During the signal pickup while the flip-flop 82 is opened, the AND gate 81 is closed. While the AND gate 80 is opened, the main clock signal is divided to send the master clock signal of a long period to the OR gate 84.

The driver 33 generates a plurality of clock signals having different phases based on the master clock signal outputted from the OR gate 84. The image sensor 32 is driven by the clock signals having different phases The image sensor 32 is comprised by a sensing area 32a, transfer area 32b and output area 32c. The sensing area 32a has pixels 320 arranged in a matrix configuration and photoelectrically converting incident light into an electric charge and storing it. The transfer area 32b stores the charge signal received from the sensing area 32a. The output area 32c horizontally transfers the charge signal vertically transferred from the transfer area 32b and converts the charge signal into a voltage signal to output it as a blue color signal. While incident light is photoelectrically converted at the sensing area 32a, the transfer area 32b transfers to the output area 32c the charge signal previously photoelectrically converted and frame-transferred, and empties each pixel 320 before a new charge signal is frame-transferred from the sensing area 32a. These pixels 320 are arranged 25 pixels in the vertical direction and 25 pixels in the horizontal direction, for example.

The driver 33 outputs a vertical sync signal, horizontal sync signal (H-sync) and sampling pulses (SP). The vertical sync signal is sent to the AND gate 86 to obtain a logical product with respect to the storage start signal. The output of the AND gate 86 is counted by a counter 84 and the count is sent to a decoder 88. The counter 87 counts after the start of storage the number of transitions of the vertical sync signal from "L" to "H". When the counter is "1", the decoder 88 sends the storage end signal to the controller 52 to initiate the generation of the pickup start signal. When the count of the counter 87 is "2", the decoder 88 sends the signal pickup end signal to the controller 52 to indicate that the next color signal pickup is possible.

Since the image sensor 32 operates periodically, the blue color signal is outputted from the output area 32c during the time other than the pre-scan and main scan. Such blue color signals are not necessary for reproducing the color image so that they are inhibited without further being processed by the signal processor. This is accomplished by preventing the sampling pulses from inputting to the A/D converter 57, because the A/D converter 57 operates in syncro with the sampling pulse. To this end, there are provided a flip-flop 89 which is set by the pickup start signal and reset by the pickup end signal and an analog switch 90 connected to the output terminal Q of the flip-flop 89. If this analog switch 90 is used, the analog switch 34 shown in FIG. 1 is not necessary. The sampling pulse, horizontal sync signal and vertical sync signal are inputted to an AND gate 91 so that the sampling pulses are sent to the address counter 54 only during the signal pickup during the pre-scan and main scan.

After completion of the pre-scan or main scan, the controller 52 outputs reset signals to reset the timer 70, flip-flop 82 and counter 87. Thereafter, the image sensor 32 performs the storage and readout in an ordinary period and inhibits the readout blue color signal to be processed.

FIG. 6 is a timing chart showing the operation of storage and pickup during the main scan. After the storage start signal is outputted from the controller 52, the AND gate 73 is closed at the time of the trailing edge of the first vertical sync signal. After the lapse of the predetermined storage extension time, the AND gate 73 is opened to send the main clock signal and hence the master clock signal to the driver 33. Then, after the lapse of the normal storage time, the vertical sync signal changes to "H" so that the frame transfer starts and the storage is completed. After the frame transfer is complete and the vertical sync signal again changes to "L", then the AND gate 78 is closed to wait for the signal pickup. When the pickup start signal is outputted from the controller 52, the AND gate is opened to actuate the driver 33 and start the signal pickup.

In the above embodiment, although the frame transfer method has been described, the interline method is also applicable. In the case of the interline method, it is possible to adjust the storage time by stopping the main clock signal and delaying the generation of the shift signal.

In the MOS type image sensor, charge signals respectively stored in a plurality of pixels of the sensing area are directly picked up by the MOS transistors arranged in a matrix configuration. Therefore, if the signal pickup is delayed, the storage continues during such delaying period. Accordingly, as shown in FIG. 3, it is necessary to eliminate the wait time for the signal pickup by shifting the storage start for each color, or to shield incident color light by using a shutter, cut filter or the like.

FIG. 7 shows an example of the blue color controller using an MOS-type image sensor wherein incident light is shielded by using a liquid crystal after the lapse of the storage time. Elements similar to those in FIG. 4 have been designated by the same reference numbers. An MOS-type image sensor 95 is comprised by a photoelectric conversion area 95a for photoelectrically converting incident light and storing charge signals and a scanning area 95b with MOS transistors arranged in a matrix configuration. The blue signal is read out of the image sensor 95 while scanning the scanning area 95b in syncro with the clock signals from a driver 96. The MOS-type image sensor 95 alternately performs the storage and readout in the predetermined period. As shown in FIG. 8, after the storage start signal is outputted from the controller 52 and when the vertical sync signal falls after completion of the ordinary storage, a flip-flop 97 is set to start operating a timer 70. When the flip-flop 97 is set, an AND gate 98 is closed so that the master clock signal obtained by dividing the main clock signal by a frequency divider 99 will not be inputted to a driver 96.

In this case, since the driver 96 is inoperative, the signal pickup is temporarily stopped. Even in the case of the temporary stoppage of the signal pickup, the blue color light passed through a closed liquid crystal 100 and blue filter 101 is applied to the photoelectric conversion area 95a so that the storage continues as it is.

After the lapse of the storage extension time, the output at the output terminal O of the timer changes to "H" to set a flip-flop 102. When the flip-flop 102 is set, a driver 103 is driven to close the liquid crystal 100 so that the blue color light is not applied to the photoelectric conversion area 95a and the storage is stopped.

As the controller 52 outputs the pickup start signal, the flip-flop 97 is reset so that the master clock signal is inputted to the driver 96. Then, the delayed blue color signal pickup starts. During the blue color signal pickup, the driver 96 sends a clock signal to the scanning area 95b to turn ON for a predetermined period the MOS transistors arranged in a matrix configuration to sequentially pick up the blue color signal. The blue color signal pickup is carried out slowly with the aid of the frequency divider 99.

After the completion of the pre-scan or main scan, a reset signal is outputted from the controller 52 to reset the associated circuits. When the flip-flop 89 is reset, the driver 103 stops its operation to make the liquid crystal 100 resume its open state.

Figure 9:
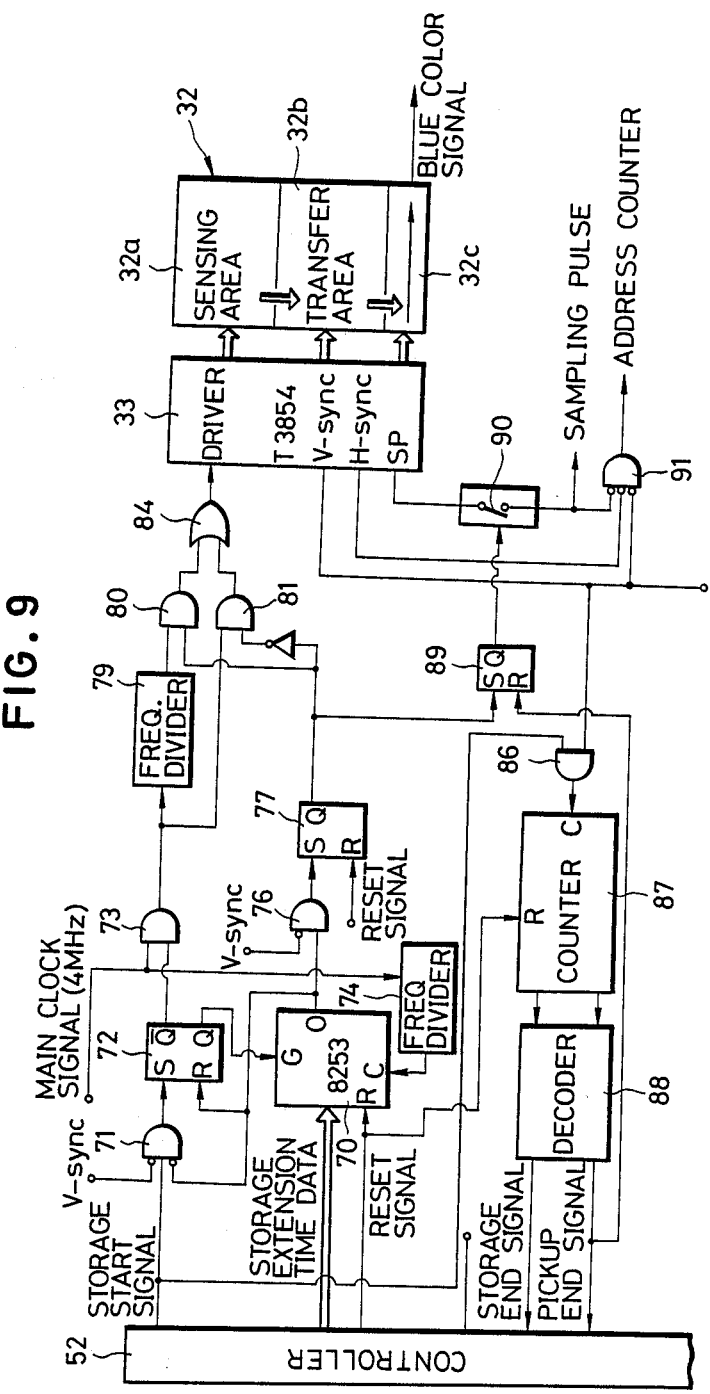
FIG. 9 is a circuit diagram showing one example of the blue color controller wherein the wait time for the signal pickup is short.

FIG. 9 shows an example of the blue color controller wherein the charge signal is picked up immediately after the charge signal is transferred and the storage is completed. Elements similar to those in FIG. 4 have been designated by the same reference numbers. In this embodiment, the flip-flop 82 and AND gate 78 are omitted so that a driver 33 immediately starts the signal pickup without temporarily stopping its operation after the transfer period.

Figure 10:
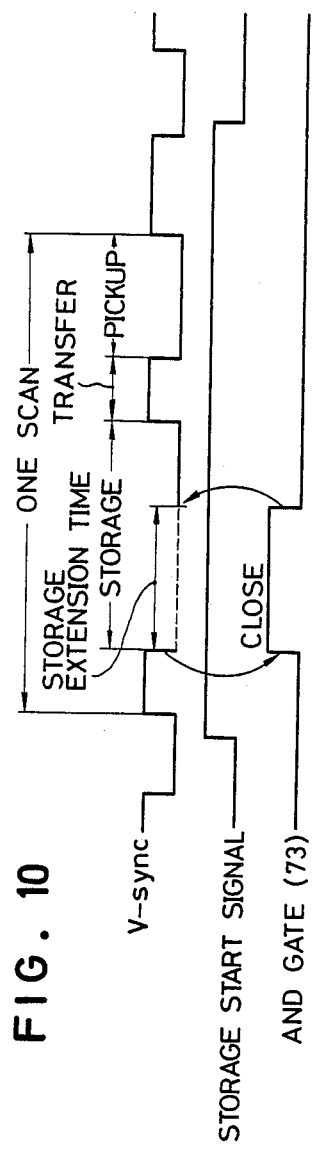
FIG. 10 is a timing chart showing the operation of one scan as in the circuit of FIG. 9.

FIG. 10 is a timing chart showing the operations of storage and signal pickup of the blue color controller of FIG. 9. After the storage start signal is outputted from a controller 52, an AND gate 73 closes at the time of the trailing edge of the first vertical sync signal. After the lapse of the predetermined storage extension time, the AND gate 73 opens to send the master clock signal to the driver 33. Thereafter, after the lapse of the predetermined storage time, the vertical sync signal changes to "H" so that the frame transfer starts and the storage is completed. After completion of the frame transfer and after the vertical sync signal again falls, the blue color signal pickup starts. The blue color signal pickup is performed slowly using the master clock signal of a long period divided by a frequency divider 79.

In the above embodiments, an image area sensor has been used. However, instead of the image area sensor, an image line sensor may be used by moving a color original in the direction perpendicular to the longitudinal direction of the image line sensor.

Obviously, many modifications and variations of the present invention are possible in the light of the above teachings. It is therefore intended to cover in the appended claims all such modifications and variations as fall within the true spirit and scope of the invention.

What is claimed is:

1. An image readout apparatus comprising:
   a plurality of image sensors (32, 39, 44) each having a plurality of pixels (320) for photoelectrically converting incident light and storing a signal;
   means (33, 40, 45) for driving said image sensors (32, 39, 44) in parallel;

charge storage time setting means (48, 49, 50, 52, 63) for setting a charge storage time independently for each image sensor (32, 39, 44) according to the intensity of light incident thereon in such a way that a maximum value of the signal becomes the saturation value of the image sensor;

signal pickup control means (48, 49, 50, 52, 63) for determining a signal pickup time in such a way that the signal pickup times of said image sensors (32, 39, 44) do not overlap each other in time; and signal processor means (55, 57, 58, 59) for processing a time sequential signal corresponding to a signal which is sequentially picked up from said image sensors (32, 39, 44).

2. An image readout apparatus according to claim 1, wherein said image sensor is an MOS-type image sensor, and means for shielding a photoelectric conversion area (95a) of said MOS-type image sensor from light when a predetermined charge storage time lapses.

3. An image readout apparatus according to claim 1, wherein said plurality of image sensors comprises: a blue color image sensor for photoelectrically converting blue light and storing a blue color signal; a green color image sensor for photoelectrically converting green light and storing a green color signal; and a red color image sensor for photoelectrically converting red light and storing a red color signal.

4. An image readout method for reading an image with a plurality of image sensors by photoelectrically converting incident light and storing a signal, comprising the steps of:

setting a charge storage time independently for each image sensor according to the intensity of light incident thereon in such a way that a maximum value of the signal becomes approximately the saturation value of the image sensor;

starting a charge storage for each of said plurality of image sensors at the same time;

terminating said charge storages when said set charge storage time of each image sensor lapses; and picking up a time sequential signal corresponding to said signal for said image sensor in a charge completion of said plurality of image sensors.

5. An image readout method according to claim 4, wherein said image sensor is an MOS-type image sensor, and means for shielding a photoelectric conversion area of said MOS-type image sensor from light when a predetermined charge storage time lapses.

6. An image readout method for reading an image with a plurality of image sensors by photoelectrically converting incident light and storing a signal, comprising the steps of:

setting a charge storage time independently for each image sensor according to the intensity of light incident thereon in such a way that a maximum value of the signal becomes approximately the saturation value of the image sensor;

shifting a storage start time of each image sensor in such a way as to shorten a wait time for signal pickup for each image sensor; and performing charge storage for each image sensor in parallel and performing signal pickup in series.

7. An image readout method according to claim 6, wherein said image sensor is an MOS-type image sensor.

8. An image readout method according to claim 6, wherein said plurality of image sensors comprises: a blue color image sensor for photoelectrically converting blue light and storing a blue color signal; a green color image sensor for photoelectrically converting green light and storing a green color signal; and a red color image sensor for photoelectrically converting red light and storing a red color signal.

9. An image readout apparatus comprising:

a plurality of CCD type image sensors (32, 39, 44) each having a plurality of pixels (320) for photoelectrically converting incident light and storing a signal;

means (33, 40, 45) for driving said image sensors (32, 39, 44) in parallel;

charge storage time setting means (48, 49, 50, 52, 63) for setting a charge storage time independently for each image sensor (32, 39, 44);

means for extending said charge storage time for a predetermined time by preventing, during charge storage, a master clock signal from being input to said driving means for dividing said CCD type image sensor;

signal pickup control means (48, 49, 50, 52, 63) for determining a signal pickup time in such a way that the signal pickup times of said image sensors (32, 39, 44) do not overlap each other;

means for inhibiting during signal pickup said master clock signal, thereby to delay said signal pickup by a predetermined period of time; and signal processor means (55, 57, 58, 59) for processing a time sequential signal corresponding to a signal which is sequentially picked up from said image sensors (32, 39, 44).

10. An image readout apparatus comprising:

a plurality of image sensors (32, 39, 44) each having a plurality of pixels (320) for photoelectrically converting incident light and storing a signal;

means (33, 40, 45) for driving said image sensors (32, 39, 44) in parallel;

charge storage time setting means (48, 49, 50, 52, 63) for setting a charge storage time independently for each image sensor (32, 39, 44);

signal pickup control means (48, 49, 50, 52, 63) for determining a signal pickup time in such a way that the signal pickup times of said image sensors (32, 39, 44) do not overlap each other; and signal processor means (55, 57, 58, 59) for processing a time sequential signal corresponding to a signal which is sequentially picked up from said image sensors (32, 39, 44), said signal processor means comprising an amplifier for amplifying said time sequential signal, an A/D converter for converting the ouput signal of said amplifier into a digital signal, a log-conversion table for logarithmically converting said digital signal, and a reference table for specifying the output signal obtained from said log-conversion table.

11. An image readout method for reading an image with a plurality of CCD type image sensors by photoelectrically converting incident light and storing a signal, comprising the steps of:

setting a charge storage time independently for each sensor based on incident light applied thereto;

starting a charge storage for each of said plurality of image sensors at the same time;

terminating said charge storages when said set charge storage time of each image sensor lapses;

picking up a time sequential signal corresponding to said signal for said image sensor in a charge completion of said plurality of image sensors;

preventing, during charge storage, a master clock signal from being inputted to a driver for driving said CCD type image sensor, thereby to extend said charge storage time for a predetermined period of time; and inhibiting, during signal pickup, said master clock signal, thereby to delay a signal pickup time by a predetermined period of time.

12. An image readout method for reading an image with a plurality of image sensors by photoelectrically converting incident light and storing a signal, comprising the steps of:

setting a charge storage time independently for each sensor based on incident light applied thereto;

shifting a storage start time of each image sensor in such a way as to shorten a wait time for signal pickup for each image sensor;

performing charge storage for each image sensor in parallel and performing signal pickup in series; and initiating the storage start for each image sensor starting from the image sensor having a longest charge storage time and progressing to the image sensor having a shortest charge storage time.

13. An image readout method for reading an image with a plurality of image sensors by photoelectrically converting incident light and storing a signal, comprising the steps of:

setting a charge storage time independently for each sensor based on incident light applied thereto;

shifting a storage start time on each image sensor in such a way as to shorten a wait time for signal pickup for each image sensor;

performing charge storage for each image sensor in parallel and performing signal pickup in series; and preventing, during charge storage, a master clock signal from being inputted to a driver for driving said CCD type image sensor, thereby to extend said charge storage time for a predetermined period of time.

* * * * *